(12) United States Patent
Eguchi

(10) Patent No.: US 8,659,805 B2
(45) Date of Patent: Feb. 25, 2014

(54) MOTOR DRIVING CONTROL DEVICE, IMAGE FORMING APPARATUS, AND IMAGE FORMING METHOD

(75) Inventor: Atsuhiko Eguchi, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 296 days.

(21) Appl. No.: 13/171,414

(22) Filed: Jun. 28, 2011

(65) Prior Publication Data

US 2012/0014732 A1    Jan. 19, 2012

Related U.S. Application Data

(60) Provisional application No. 61/363,983, filed on Jul. 13, 2010.

(51) Int. Cl.
| | | |
|---|---|---|
| H04N 1/04 | (2006.01) | |
| G06F 15/00 | (2006.01) | |
| G03G 15/00 | (2006.01) | |
| G05B 11/28 | (2006.01) | |
| H02P 23/00 | (2006.01) | |
| H02P 8/00 | (2006.01) | |
| H02K 27/30 | (2006.01) | |
| H02P 6/04 | (2006.01) | |

(52) U.S. Cl.
USPC ............ 358/474; 358/1.8; 358/1.9; 399/397; 399/10; 318/599; 318/798; 318/696; 318/434; 318/400.01

(58) Field of Classification Search
USPC ................ 358/474, 1.8, 1.9; 399/397, 10; 318/473, 599, 798, 696, 434, 400.01; 400/124.03; 702/182
See application file for complete search history.

(56) References Cited

U.S. PATENT DOCUMENTS

| | | | | |
|---|---|---|---|---|
| 3,798,366 | A | * | 3/1974 | Hunt et al. ................. 374/124 |
| 5,588,092 | A | * | 12/1996 | Komiya et al. .............. 358/1.9 |
| 5,998,956 | A | * | 12/1999 | Saito ........................ 318/696 |
| 7,692,399 | B2 | * | 4/2010 | Harriman et al. ........... 318/798 |
| 2004/0195989 | A1 | * | 10/2004 | Harriman et al. .......... 318/599 |
| 2007/0279649 | A1 | * | 12/2007 | Nakamaki et al. ........... 358/1.8 |
| 2008/0243436 | A1 | * | 10/2008 | Tsutsui et al. ............... 702/182 |
| 2010/0073703 | A1 | * | 3/2010 | Tamada .................... 358/1.14 |
| 2010/0119279 | A1 | * | 5/2010 | Nakamaki et al. ....... 400/124.03 |
| 2010/0244757 | A1 | * | 9/2010 | Tsai et al. .................. 318/434 |
| 2011/0052217 | A1 | * | 3/2011 | Mochizuki .................. 399/10 |
| 2012/0001579 | A1 | * | 1/2012 | Mori ........................ 318/473 |

FOREIGN PATENT DOCUMENTS

JP      06-121592      4/1994

* cited by examiner

*Primary Examiner* — Charlotte M Baker
*Assistant Examiner* — Rury Grisham
(74) *Attorney, Agent, or Firm* — Patterson & Sheridan, LLP (57) ABSTRACT

Certain embodiments provide a motor driving control device including a motor driver, a storage device, and a control section. The motor driver supplies a motor driving current for driving a motor to the motor. The storage device stores a first data table in which temperature around the motor, a current value of the motor driving current set to prevent the motor from stepping out at the temperature, and a driving voltage set in the motor driver in order to cause the motor driver to output the motor driving current having the current value are associated with one another for each temperature around the motor. The control section controls the motor driver to output the motor driving current having a predetermined current value associated with the temperature around the motor in the first data table.

17 Claims, 10 Drawing Sheets

MOTOR DRIVING CONTROL DEVICE, IMAGE FORMING APPARATUS, AND IMAGE FORMING METHOD

CROSS-REFERENCE TO RELATED APPLICATION

This application is based upon and claims the benefit of priority from Provisional U.S. Applications 61/363,983 filed on Jul. 13, 2010, the entire contents of which are incorporated herein by reference.

FIELD

Embodiments described herein relate generally to a motor driving control device, an image forming apparatus, and an image forming method.

BACKGROUND

An image forming apparatus includes a pulse motor in order to rotate sections that need to rotate (e.g., a photoconductive drum and a sheet conveying roller). The pulse motor is driven by a motor driving current supplied from a motor driving control device and rotates a predetermined amount according to a pulse train supplied from the motor driving control device.

The motor driving control device supplies the motor driving current to the pulse motor such that the pulse motor supplies torque larger than step-out torque (torque at least necessary for rotating a load) to a load (e.g., the sheet conveying roller).

For example, the load of the sheet conveying roller fluctuates according to temperature in the image forming apparatus and increases as the temperature of the inside of the image forming apparatus is lower.

In the image forming apparatus in the past, a current value of the motor driving current supplied from the motor driving control device is set such that torque larger than step-out torque during a large load and low temperature (e.g., −5° C.) is supplied to the load. Since the current value of the motor driving current is set in this way, even if load fluctuation occurs because of fluctuation in temperature, the pulse motor supplies torque larger than step-out torque during the load fluctuation to the load. Therefore, it is possible to suppress the pulse motor from stepping out.

However, even if a load is small, for example, even if the temperature of the image forming apparatus is the room temperature (e.g., 20° C.), the motor driving control device supplies a motor driving current having a current value set with reference to a large load to the pulse motor. Therefore, if a load is small, since an electric current more than necessary is supplied to the pulse motor, the image forming apparatus in the past wastefully consumes electric power.

When the electric current more than necessary is supplied to the pulse motor, a heat value of the pulse motor increases. According to heat generation, torque generated by the pulse motor decreases and the pulse motor steps out. Therefore, in the past, it is difficult to continuously drive the pulse motor for a long time. In order to continuously drive the pulse motor for a long time, it is necessary to take measures, for example, adopt a pulse motor that can generate larger torque or provide a cooling mechanism such as a fan or a heat radiation plate for cooling the pulse motor.

DETAILED DESCRIPTION

In general, according to one embodiment, a motor driving control device includes a motor driver, a storage device, and a control section. The motor driver supplies a motor driving current for driving a motor to the motor. The storage device stores a first data table in which temperature around the motor, a current value of the motor driving current set to prevent the motor from stepping out at the temperature, and a driving voltage set in the motor driver in order to cause the motor driver to output the motor driving current having the current value are associated with one another for each temperature around the motor. The control section controls the motor driver to output the motor driving current having a predetermined current value associated with the temperature around the motor in the first data table.

In general, according to another embodiment, an image forming apparatus includes an image reading section, an image forming section, a paper discharge roller, a motor, a temperature and humidity sensor, a motor driver, a storage device, and a control section. The image reading section reads an image of an original document and forms image data of the image of the original document. The image forming section forms a copy image based on the image data on a sheet. The paper discharge roller discharges the sheet having the copy image formed thereon. The motor drives the paper discharge roller. The temperature and humidity sensor detects temperature around the motor. The motor driver supplies a motor driving current for driving the motor to the motor. The storage device stores a first data table in which the temperature around the motor, a current value of the motor driving current set to prevent the motor from stepping out at the temperature, and a driving voltage set in the motor driver in order to cause the motor driver to output the motor driving current having the current value are associated with one another for each temperature around the motor. The control section controls the motor driver to output the motor driving current having a predetermined current value associated with the detected temperature around the motor in the first data table.

In general, according to still another embodiment, an image forming method includes detecting temperature around a motor, driving the motor, rotating a paper discharge roller, and discharging a sheet. The motor is driven by being supplied with, according to a first data table in which the temperature around the motor, a current value of a motor driving current set to prevent the motor from stepping out at the temperature, and a driving voltage set in the motor driver in order to cause a motor driver, which is configured to drive the motor, to output the motor driving current having the current value are associated with one another for each temperature around the motor, the motor driving current having the current value associated with the detected temperature around the motor. The paper discharge roller discharges a sheet having a copy image of an original document formed thereon. The paper discharge roller rotates according to the driving of the motor. The discharge of the sheet is executed by the rotation of the paper discharge roller.

Embodiments of the motor driving control device, the image forming apparatus, and the image forming method are explained below.

First Embodiment

Figure 1:
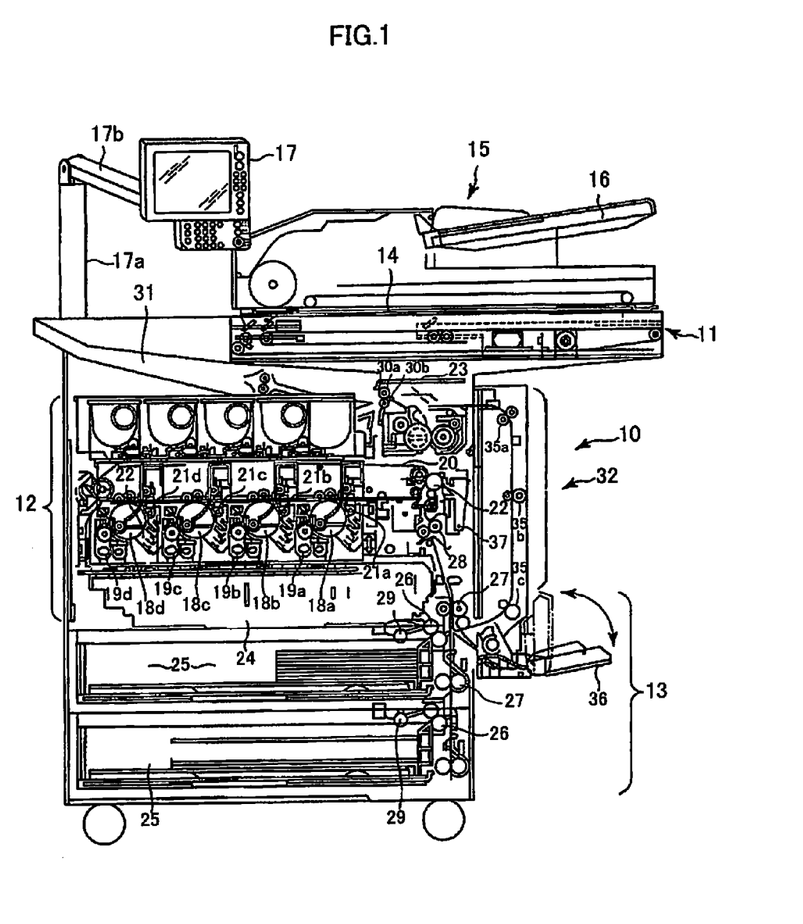
FIG. 1 is a schematic diagram of an image forming apparatus according to a first embodiment.

FIG. 1 is a schematic diagram of an image forming apparatus according to a first embodiment. An image forming apparatus 101 shown in FIG. 1 is an MFP (MultiFunction Peripheral or MultiFunction Printer) 10. The MFP 10 shown in FIG. 1 includes an image reading section 11, an image forming section 12, and a sheet feeding section 13.

The image reading section 11 includes a document table (a document glass) 14 configured to support an original document and an image sensor (e.g., a CCD sensor) (not shown) configured to form image data. The image reading section 11 irradiates light, which is emitted from an illumination device (not shown), on the original document arranged on the document table 14 and converts reflected light of the light into an image signal with the CCD sensor. Consequently, the image reading section 11 reads an image of the original document and forms image data on the basis of the read image.

The image reading section 11 includes an auto document feeder (ADF) 15. The ADF 15 guides an original document placed on a sheet tray 16 of the ADF 15 to a predetermined position on the document table 14. The image reading section 11 may include a document cover instead of the ADF 15.

The CCD sensor of the image reading section 11 may be located in a document moving path on the document table 14 on which the original document is moved by the ADF 15. If the CCD sensor is located in the document moving path on the document table 14 on which the original document is moved by the ADF 15, it is possible to read the original document without locating the original document on the document table 14.

The MFP 10 includes an operation panel (an operation section) 17. The operation panel 17 is an operation input section for giving a start instruction for reading of a document image by the image reading section 11 and giving a start instruction for image formation to the image forming section 12. The operation panel (the operation section) 17 is supported by a column 17a, which is fixed to the image forming section 12, and a swing arm 17b at a corner on the left side, the right side, or the like of the image reading section 11.

The image forming section 12 of the MFP 10 forms a copy image of the document image on a sheet on the basis of the image data. The image forming section 12 includes first to fourth photoconductive drums 18a to 18d configured to carry latent images, developing devices 19a to 19d configured to supply toners to the latent images carried by the photoconductive drums 18a to 18d and develop the latent images, a transfer belt 20 configured to transfer, in order, toner images carried by the photoconductive drums 18a to 18d, first to fourth cleaners 21a to 21d configured to respectively remove the toners remaining on the photoconductive drums 18a to 18d from the photoconductive drums 18a to 18d, a transfer device 22 configured to transfer the toner images carried by the transfer belt 20 onto a sheet, a fixing device 23 configured to fix, to a sheet, a copy image of the original document formed on the sheet according to the transfer of the toner images onto the sheet by the transfer device 22, and an exposing device 24 configured to form latent images on the photoconductive drums 18a to 18d.

The first to fourth developing devices 19a to 19d store toners of arbitrary colors of Y (yellow), M (magenta), C (cyan), and Bk (black) used to obtain a color image through subtractive color mixture, supply the toners of Y, M, C, and Bk to the latent images respectively carried by the photoconductive drums 18a to 18d, and visualize the latent images with any ones of the colors. The order of the colors is determined as a predetermined order according to an image forming process and characteristics of the toners.

The transfer belt 20 carries, in the order of formation of the toner images, the toner images of the colors formed by the first to fourth photoconductive drums 18a to 18d and the developing devices 19a to 19d corresponding to the first to fourth photoconductive drums 18a to 18d.

The sheet feeding section 13 feeds the sheet, onto which the toner images are transferred, to the transfer device 22 of the image forming section 12 at predetermined timing.

The sheet feeding section 13 includes plural cassette slots 25, plural separating mechanisms 26, plural conveying rollers 27, and an aligning roller 28.

Cassettes (not shown) located in the plural cassette slots 25 store sheets of arbitrary sizes. Pickup rollers 29 pick up sheets from the cassettes according to an image forming operation. The size of the sheets corresponds to a magnification requested in image formation and the size of the toner images formed by the image forming section 12.

The separating mechanisms 26 arranged near the cassette slots 25 prevent two or more sheets from being picked up from the cassettes by the pickup rollers 29 at a time.

The plural conveying rollers 27 convey one sheet separated by the separating mechanisms 26 to the aligning roller 28. The aligning roller 28 conveys, according to timing when the transfer device 22 transfers the toner images from the transfer belt 20, the sheet to a transfer position where the transfer device 22 and the transfer belt 20 are in contact with each other.

The MFP 10 includes a pair of paper discharge rollers 30a and 30b. The sheet having the copy image of the original document, which is formed by the toner images, formed on one surface or both surfaces thereof is discharged to a stock section 31 located in a space between the image reading section 11 and the image forming section 12 according to rotation of the pair of paper discharge rollers 30a and 30b.

The sheet having the copy image fixed on one surface (a front surface) is discharged to an automatic duplex unit (ADU) 32 explained later according to the rotation of the pair of paper discharge rollers 30a and 30b.

A direction in which the pair of paper discharge rollers 30a and 30b rotate to discharge the sheet to the stock section 31 is referred to as positive direction. A direction in which the pair of paper discharge rollers 30a and 30b rotate to discharge the sheet to the ADU 32 is referred to as negative direction. Therefore, the direction of the positive (negative) direction rotation of the paper discharge roller 30a and the direction of the positive (negative) direction rotation of the paper discharge roller 30b are opposite to each other.

A pulse motor 33 (FIG. 2) is driven to generate predetermined torque, whereby each of the pair of paper discharge rollers 30a and 30b rotates in a predetermined direction.

Figure 2:
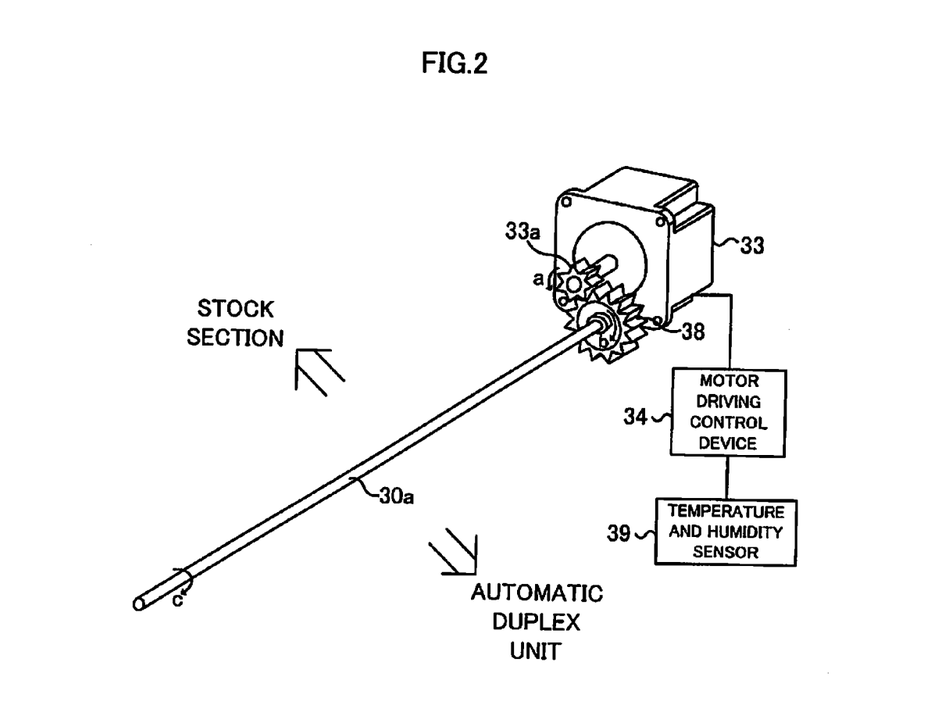
FIG. 2 is a schematic diagram for explaining a relation between a paper discharge roller and a pulse motor.

The pulse motor 33 is controlled and driven by a motor driving control device 34 (FIG. 2).

The transfer device 22 of the image forming section 12 is located in the ADU 32 configured to replace the surface (the front surface) of the sheet on which the copy image is fixed by the fixing device 23 with the surface (the rear surface) of the sheet on which the copy image is not formed. The ADU 32 includes plural ADU rollers 35a to 35c configured to convey the sheet on the inside of the ADU 32. A bypass tray 36 is attached to the ADU 32.

The ADU 32 moves to a side (the right side) if the sheet is jammed between the conveying roller 27 and the aligning roller 28 or between the aligning roller 28 and the fixing device 23 or the transfer device 22 and the fixing device 23 in the image forming section 12. The ADU 32 integrally includes a cleaner 37 configured to clean the transfer device 22.

FIG. 2 is a schematic diagram for explaining a relation between one paper discharge roller 30a and the pulse motor 33. One end of the paper discharge roller 30a is connected to a gear 38. A distal end portion of a rotating shaft section 33a of the pulse motor 33 is formed in a gear shape. The gear-shaped distal end portion of the rotating shaft section 33a and the gear 38 are in contact with each other.

The gear 38 only has to rotate according to rotation of the rotating shaft section 33a. Therefore, both the gear 38 and the rotating shaft section 33a may be formed in a disc shape and a belt may be attached in contact with the outer circumferences of the gear 38 and the rotating shaft section 33a to rotate the gear 38 according to the rotation of the rotating shaft section 33a.

The pulse motor 33 is connected to the motor driving control device 34. A temperature and humidity sensor 39 is also connected to the motor driving control device 34. The temperature and humidity sensor 39 is arranged, for example, near the pulse motor 33 and detects temperature around the pulse motor 33. The temperature and humidity sensor 39 only has to be connected to the motor driving control device 34 and can be arranged in an arbitrary place excluding a place around the fixing device 23 in the MFP 10.

If the rotating shaft section 33a of the pulse motor 33 rotates in an arrow "a" direction in the figure, teeth of the gear in the distal end portion of the rotating shaft section 33a and teeth of the gear 38 mesh with each other, whereby the gear 38 rotates in an arrow "b" direction in the figure. According to the rotation of the gear 38, the paper discharge roller 30a rotates in an arrow "c" direction (the positive direction) in the figure.

If the rotating shaft section 33a of the pulse motor rotates in a direction opposite to the arrow "a" direction in the figure, the gear 38 rotates in a direction opposite to the arrow "b" direction in the figure. According to the rotation of the gear 38, the paper discharge roller 30a rotates in a direction opposite to the arrow "c" direction in the figure (the negative direction).

The other paper discharge roller 30b is a fixed roller configured to rotate following the rotation of one paper discharge roller 30a.

Figure 3:
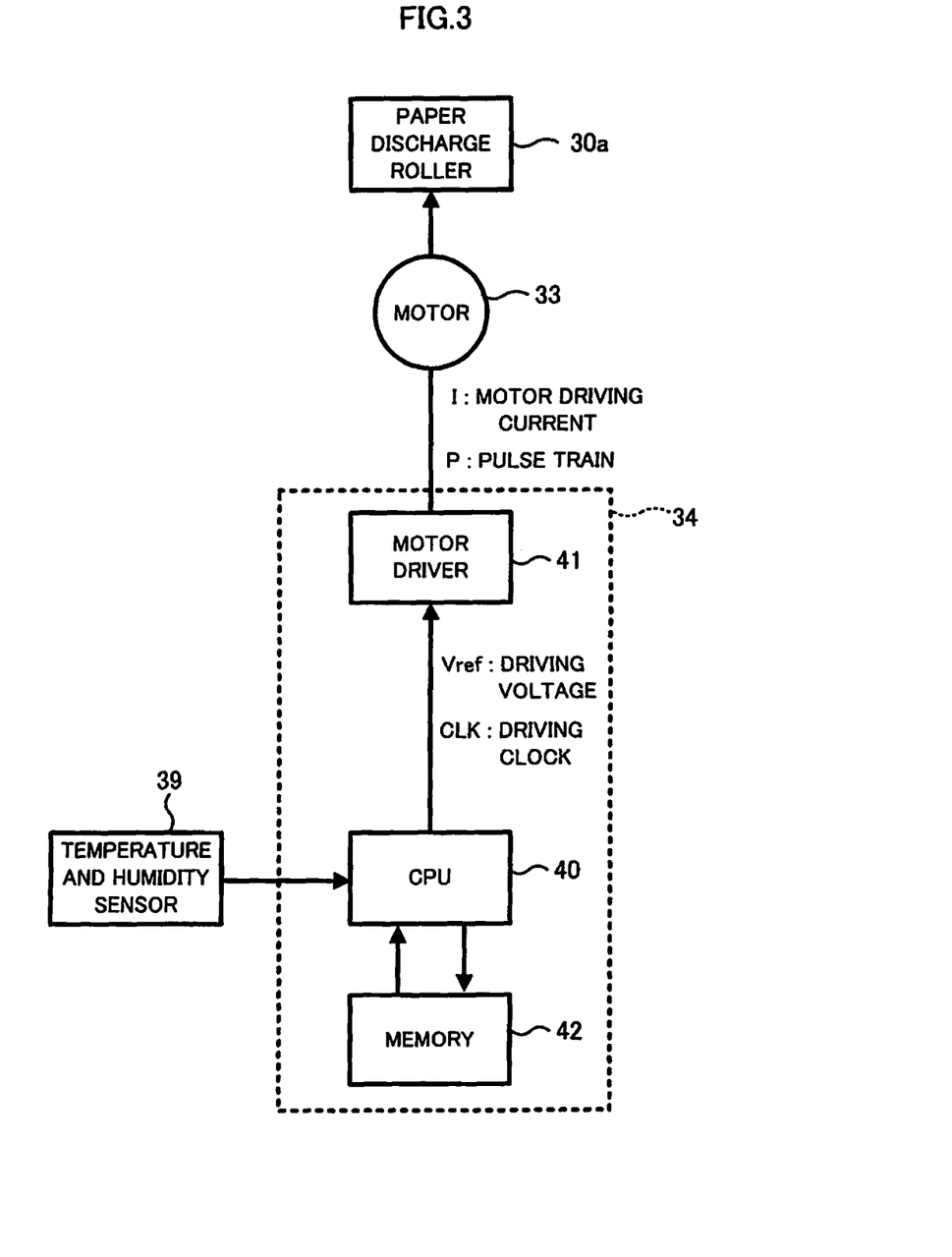
FIG. 3 is a block diagram of a motor driving control device included in the image forming apparatus according to the first embodiment.

FIG. 3 is a block diagram of the motor driving control device 34 included in the MFP 10. As shown in FIG. 3, the motor driving control device 34 includes a CPU 40 configured to control the entire motor driving control device 34. The motor driving control device 34 includes a motor driver 41 for driving the pulse motor 33 and a memory 42.

The motor driver 41 and the memory 42 are connected to the CPU 40. The temperature and humidity sensor 39 configured to detect temperature around the pulse motor 33 (the temperature around the pulse motor 33 is referred to as environment temperature) is connected to the CPU 40.

A driving voltage Vref and a driving clock CLK are supplied to the motor driver 41, whereby the motor driver 41 supplies a motor driving current I and a pulse train P to the pulse motor 33. When the pulse motor 33 receives the pulse train P, the pulse motor 33 rotates by an amount specified by pulses included in the pulse train P. The pulse motor 33 generates torque specified by a current value of the motor driving current I.

The memory 42 stores a first data table. In the first data table, environment temperatures, current values of the motor driving current I set to prevent the pulse motor from stepping out at the respective environment temperatures, and the driving voltage Vref for driving the motor driver 41 to output the motor driving current I having the current values are associated with one another. Therefore, the driving voltage Vref can be read out from the first data table on the basis of detected environment temperature.

The CPU 40 is a control section of the motor driver 41. The CPU 40 reads out the driving voltage Vref from the first data table on the basis of environment temperature and sets the driving voltage Vref in the motor driver 41.

The CPU 40 supplies a desired driving clock CLK to the motor driver 41 to thereby control the motor driver 41 to supply the pulse train P for rotating the pulse motor 33 by a predetermined amount to the pulse motor 33.

Figure 4:
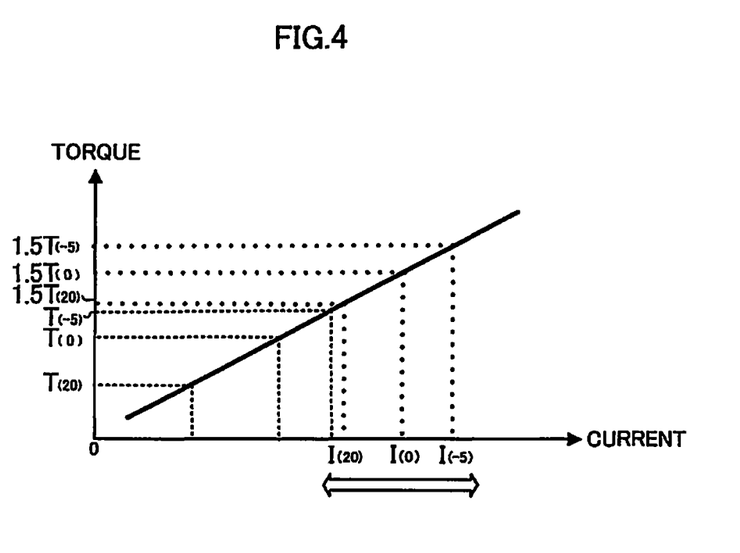
FIG. 4 is a graph for explaining a relation between a motor driving current supplied to the pulse motor and torque generated by the pulse motor.

FIG. 4 is a graph for explaining a relation between the motor driving current I supplied to the pulse motor 33 and torque generated by the pulse motor 33. The abscissa of the graph shown in FIG. 4 indicates a current value of the motor driving current I and the ordinate indicates torque generated by the pulse motor 33. $T(20)$, $T(0)$, and $T(-5)$ in the figure respectively indicate step-out torques at the time when environment temperatures are 20° C., 0° C., and −5° C.

FIG. 4 indicates that, if a current value of the motor driving current I supplied to the pulse motor 33 is reduced, the torque generated by the pulse motor 33 decreases and reaches the step-out toques $T(20)$, $T(0)$, and $T(-5)$. The step-out torques $T(20)$, $T(0)$, and $T(-5)$ depend on environment temperature or the temperature of the pulse motor 33 explained later. The step-out torques $T(20)$, $T(0)$, and $T(-5)$ are higher as the environment temperature or the temperature of the pulse motor 33 is lower.

The first data table is formed as explained below on the basis of environment temperature and step-out torques of the pulse motor 33 at respective temperatures. First, step-out torques ($T(20)$, $T(0)$, and $T(-5)$) at respective environment temperatures (e.g., −5° C., 0° C., and 20° C.) detected by the temperature and humidity sensor 39 are measured.

The measured step-out torques ($T(20)$, $T(0)$, and $T(-5)$) are multiplied by a safety factor (e.g., 1.5) to calculate, for the respective environment temperatures, torques ($1.5T(20)$, $1.5T(0)$, and $1.5T(-5)$) that the pulse motor 33 should be caused to generate.

Referring to FIG. 4, in order to cause the pulse motor 33 to generate the calculated torques ($1.5T(20)$, $1.5T(0)$, and $1.5T(-5)$), current values ($I(20)$, $I(0)$, and $I(-5)$) of the motor driving current I that should be supplied to the pulse motor 33 are calculated.

Finally, the driving voltage Vref that should be supplied to the motor driver 41 in order to cause the motor driver 41 to output the calculated current values ($I(20)$, $I(0)$, and $I(-5)$) of the motor driving current I is obtained. A relation between the driving voltage Vref supplied to the motor driver 41 and the motor driving current I supplied from the motor driver 41 to the pulse motor 33 is different depending on the motor driver 41 in use. Therefore, the driving voltage Vref may be obtained with reference to specifications or the like of the motor driver 41 in use or may be experimentally obtained.

Through the process explained above, current values of the motor driving current I at respective environment temperatures and the driving voltage Vref are obtained, whereby the first data table is created.

The first data table may be stored while being divided into a table for start time (acceleration) of the pulse motor 33 and a table for constant speed (uniform speed) time of the pulse motor 33.

Figure 5:
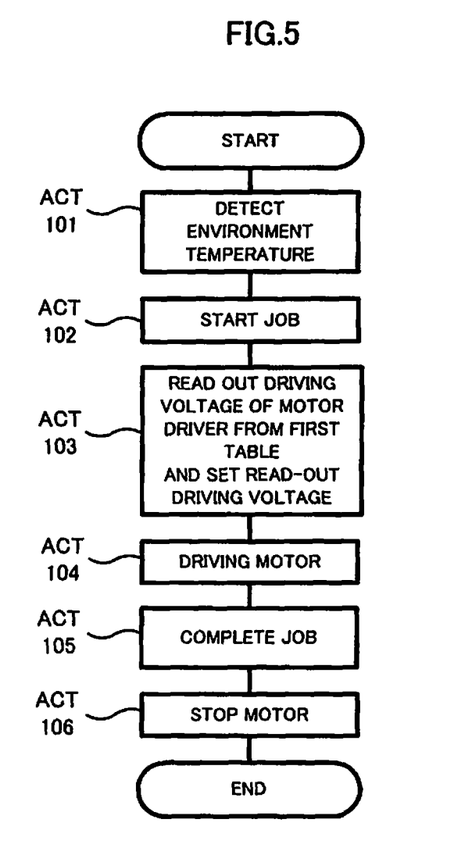
FIG. 5 is a flowchart for explaining an image forming method according to the first embodiment.

FIG. 5 is a flowchart for explaining an image forming method according to the first embodiment. The image forming method according to this embodiment is explained below with reference to FIG. 5.

First, the temperature and humidity sensor 39 detects environment temperature (Act 101). The MFP 10 starts an operation for forming a copy image (Act 102). The environment temperature may be periodically detected before the MFP 10 starts the operation for forming a copy image or may be detected at timing when a user operates the operation panel 17 in order to start the operation for forming a copy image.

Subsequently, the CPU 40 reads out, referring to the first data table stored in the memory 42, the driving voltage Vref of the motor driver 41 with respect to the detected environment temperature and sets the read-out driving voltage Vref in the motor driver 41 (Act 103).

The CPU 40 supplies a desired driving clock CLK simultaneously with setting the driving voltage Vref in the motor driver 41.

It is desirable to execute the detection of environment temperature and the setting of the driving voltage Vref in the motor driver 41 based on detected environment temperature before the pulse motor 33 is driven in the next act. However, the detection of environment temperature and the setting of the driving voltage Vref in the motor driver 41 based on detected environment temperature may be executed when the pulse motor 33 is driven under predetermined conditions.

When the driving voltage Vref is set in the motor driver 41 and the driving clock CLK is supplied to the motor driver 41, the motor driver 41 supplies the motor driving current I having a current value based on the environment temperature and a desired pulse train P to the pulse motor 33. Consequently, the pulse motor 33 is driven and generates predetermined torque (Act 104).

When the pulse motor 33 is driven in Act 104, the paper discharge roller 30a rotates. The rotating paper discharge roller 30a discharges a sheet having a copy image formed on one surface or both surfaces thereof to the stock section 31 or the ADU 32. When the sheet having the copy image formed on one surface thereof or the sheet reversed by the ADU 32 and having the copy image formed on both surfaces thereof is discharged to the stock section 31, the MFP 10 ends the operation for forming a copy image (Act 105). When the operation for forming a copy image is ended, the motor driver 41 ends the supply of the driving voltage Vref and the driving clock CLK to the pulse motor 33. The pulse motor 33 stops the rotation (Act 106).

With the motor driving control device, the image forming apparatus, and the image forming method according to the first embodiment explained above, an appropriate motor driving current I can be supplied to the pulse motor 33 according to environment temperature. Therefore, the power consumption of the motor driving control device 34 and the MFP 10 can be reduced more than in the past.

Further, in the motor driving control device, the image forming apparatus, and the image forming method according to the first embodiment, even if the pulse motor 33 is continuously driven, since the appropriate motor driving current I is supplied to the pulse motor 33 according to environment temperature, a temperature rise ratio of the pulse motor 33 to time can be set lower than in the past. Therefore, the pulse motor 33 can be driven longer than in the past.

In the motor driving control device, the image forming apparatus, and the image forming method according to the first embodiment, the detection of environment temperature and the setting of the motor driver 41 based on the detected environment temperature are executed before the pulse motor 33 is driven. Consequently, even if only one copy image is formed, the power consumption of the MFP 10 can be reduced more than in the past.

Second Embodiment

An image forming apparatus according to a second embodiment is different from the image forming apparatus according to the first embodiment in a motor driving control circuit 43. Therefore, the motor driving control circuit 43 included in the image forming apparatus according to the second embodiment is explained below.

Figure 6:
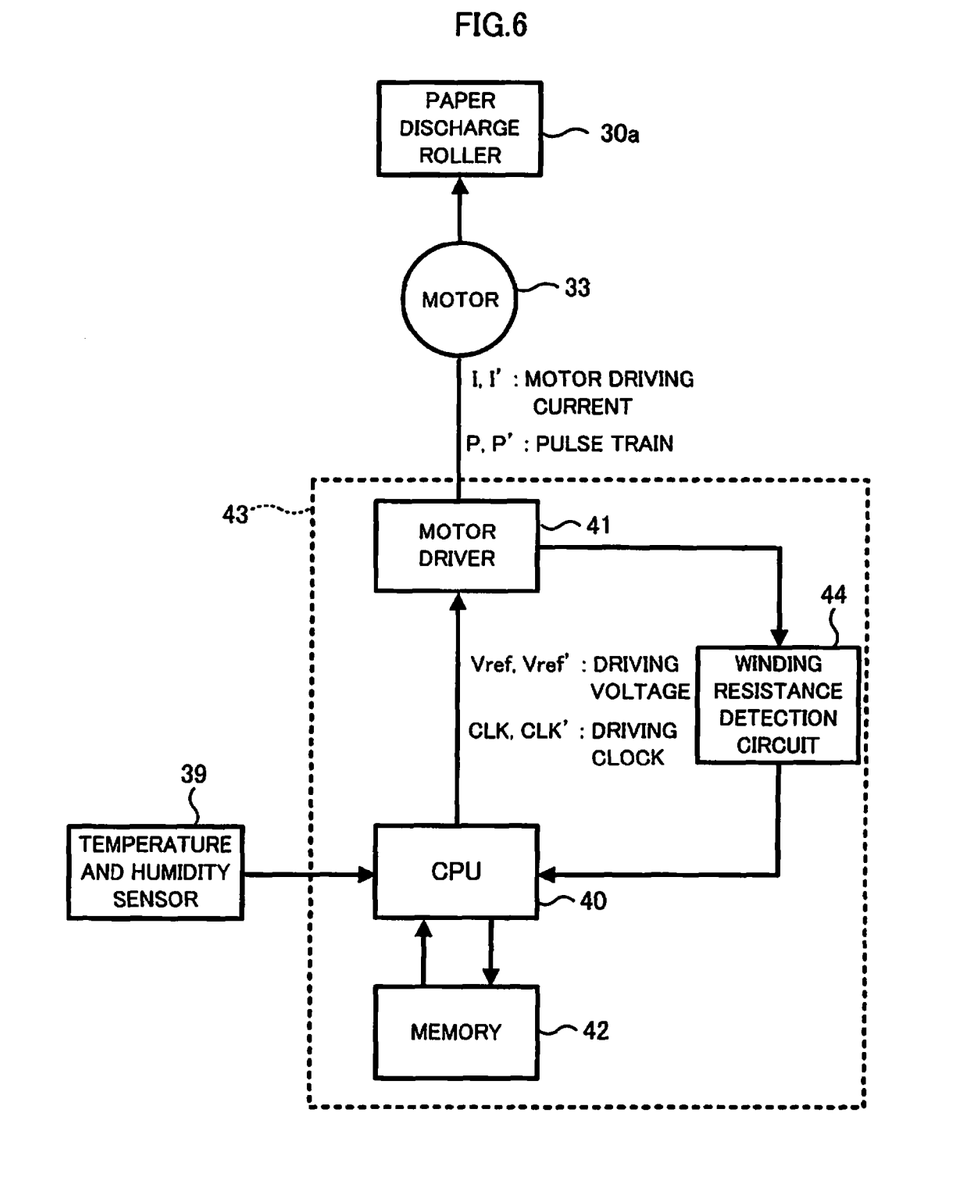
FIG. 6 is a block diagram of a motor driving control device included in an image forming apparatus according to a second embodiment.

FIG. 6 is a block diagram of the motor driving control device 43 included in the image forming apparatus according to the second embodiment. The motor driving control device 43 shown in FIG. 6 further includes a winding resistance detection circuit 44 for detecting the winding resistance of the pulse motor 33. The winding resistance detection circuit 44 is arranged between the CPU 40 and the motor driver 41 and connected to both of the CPU 40 and the motor driver 41.

The winding resistance detection circuit 44 detects a rising time to the maximum of a motor driving current waveform (a set value of the motor driving current I) and calculates the winding resistance of the pulse motor 33 on the basis of a detected value of the rising time. The winding resistance detection circuit 44 calculates the temperature of the pulse motor 33 from the calculated winding resistance.

Figure 7:
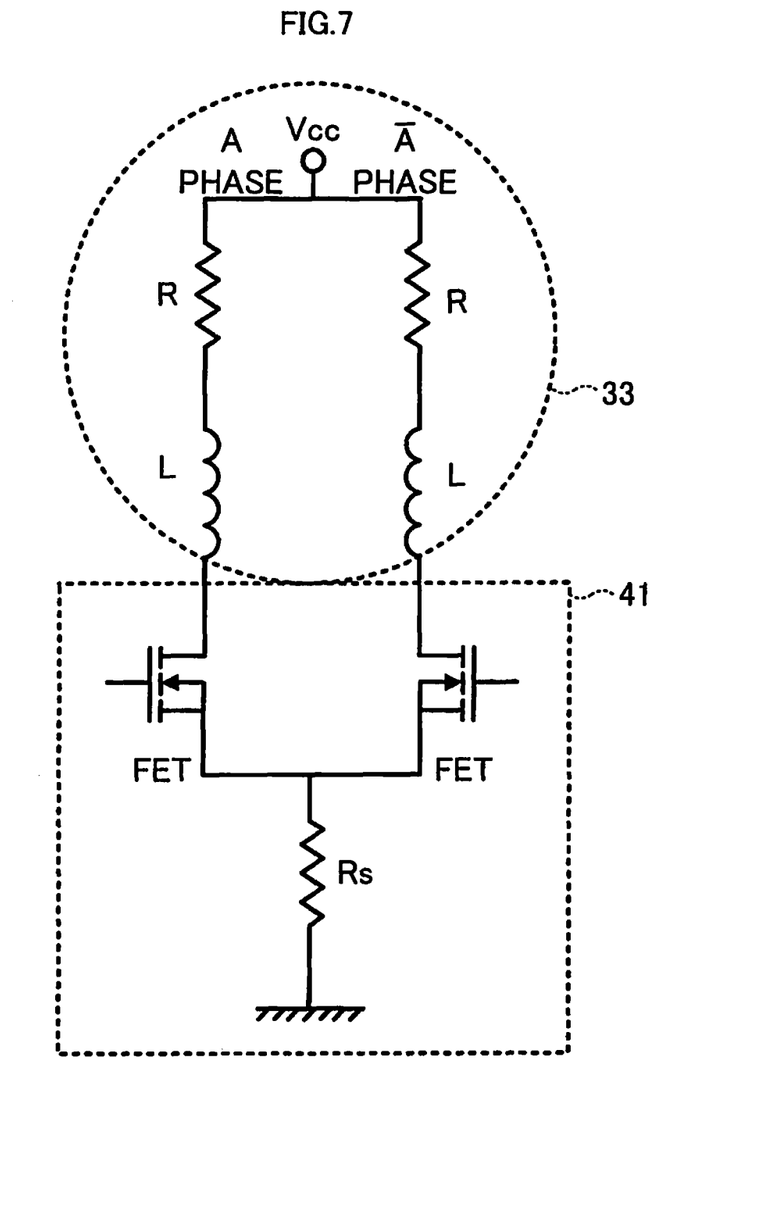
FIG. 7 is an equivalent circuit of a motor driver and a pulse motor.

Winding resistance is calculated using Formula 1 calculated using an equivalent circuit of a motor driver and a pulse motor shown in FIG. 7.

$$t = \frac{L}{R + Rs} \ln\left(1 - \frac{R + Rs}{Vcc} \times I(OH)\right) \quad \text{Formula 1}$$

In Formula 1, t represents a rising time, R represents the winding resistance of the pulse motor, Rs represents the current detection resistance of the motor driver, Vcc represents a power supply voltage value of the pulse motor, and I(OH) represents a set value of the motor driving current I.

The winding resistance R can be calculated by detecting the rising time t to the maximum of the motor driving current waveform and substituting the rising time t in Formula 1.

A relation between the winding resistance R and the temperature of the pulse motor 33 is measured in advance. If the winding resistance R is calculated from Formula 1, the temperature of the pulse motor 33 can be calculated from measurement data that indicates the relation between the winding resistance R and the temperature of the pulse motor 33.

The memory 42 of the motor driving control device 43 shown in FIG. 6 stores a second data table besides the first data table explained above. In the second data table, temperatures of the pulse motor 33, current values of a motor driving current I' set to prevent the pulse motor 33 from stepping out at the respective temperatures of the pulse motor 33, and a driving voltage Vref' for driving the motor driver to output the motor driving current I' having the current values are associated with one another. Therefore, a current value of the motor driving current I' and the driving voltage Vref' can be read out from the second data table on the basis of calculated temperature of the pulse motor 33.

The CPU 40 is not only the control section for the motor driver 41 but also a selecting section configured to select the first data table or the second data table. The CPU 40 compares environment temperature and the temperature of the pulse motor 33 to thereby select the first data table or the second data table. The CPU 40 reads out a driving voltage from the selected data table and sets the driving voltage in the motor driver 41.

The second data table only has to be created in the same manner as the first data table on the basis of calculated temperatures of the pulse motor 33 and step-out torques of the pulse motor 33 at the respective temperatures.

Like the first data table, the second data table may be stored while being divided into a table for start time (acceleration) of the pulse motor 33 and a table for constant speed (uniform speed) time of the pulse motor 33.

Figure 8:
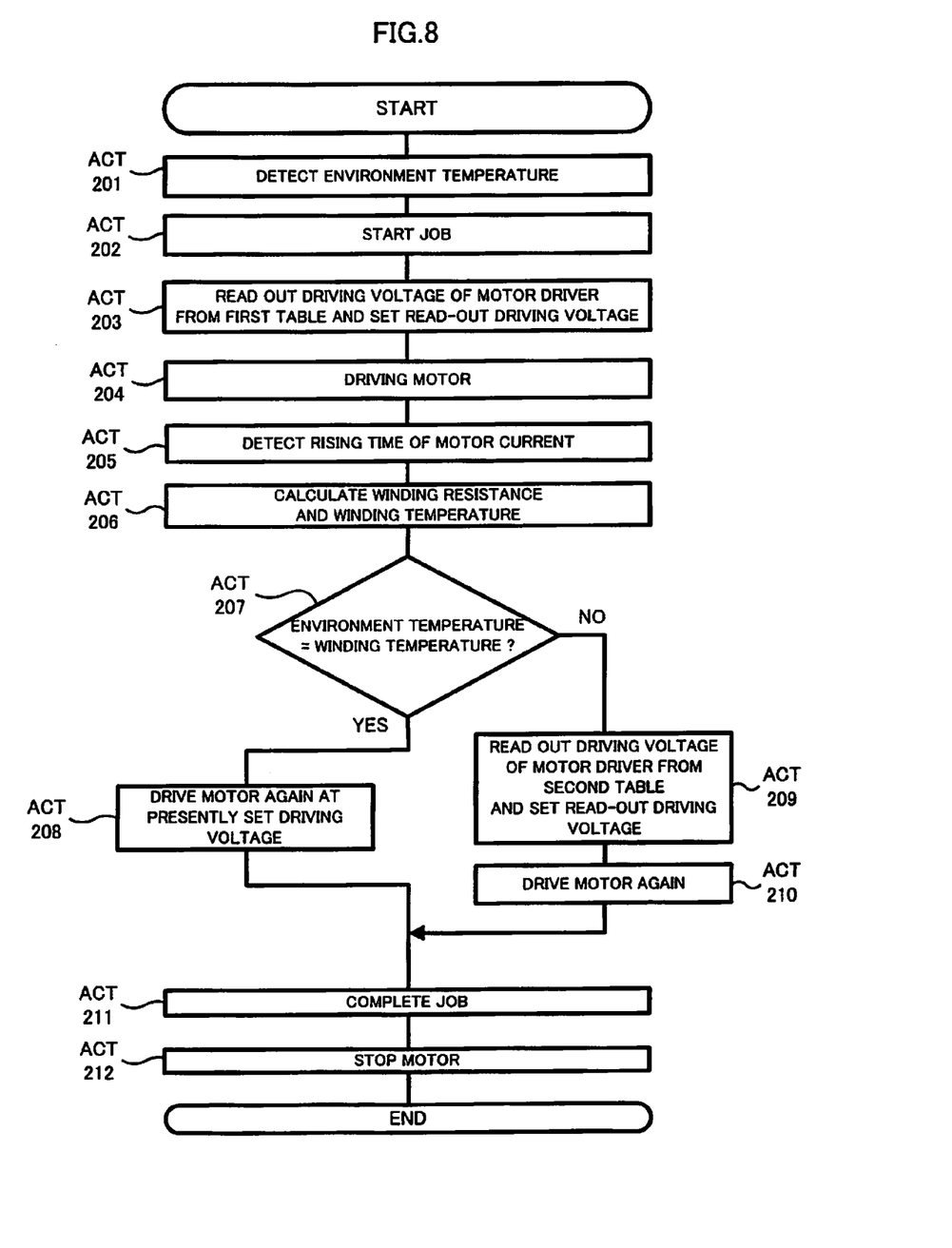
FIG. 8 is a flowchart for explaining an image forming method according to the second embodiment.

FIG. 8 is a flowchart for explaining an image forming method according to the second embodiment. The image forming method according to the second embodiment is explained with reference to FIG. 8.

First, the temperature and humidity sensor 39 detects environment temperature (Act 201). The MFP 10 including the motor driving control device 43 starts an operation for forming a copy image (Act 202).

Subsequently, the CPU 40 reads out, referring to the first data table stored in the memory 42, the driving voltage Vref of the motor driver 41 with respect to the detected environment temperature and sets the read-out driving voltage Vref in the motor driver 41 (Act 203).

The CPU 40 supplies a desired driving clock CLK simultaneously with setting of the driving voltage Vref in the motor driver 41.

When the driving voltage Vref is set in the motor driver 41 and the driving clock CLK is supplied to the motor driver 41, the motor driver 41 supplies the motor driving current I having a current value based on the environment temperature and a desired pulse train P to the pulse motor 33. Consequently, the pulse motor 33 is driven and generates predetermined torque (Act 204).

Subsequently, the winding resistance detection circuit 44 detects a rising time to the maximum of a waveform of the motor driving current I (Act 205).

The winding resistance detection circuit 44 calculates the winding resistance of the pulse motor 33 on the basis of the rising time and calculates winding temperature, i.e., the temperature of the pulse motor 33 from the calculated winding resistance (Act 206).

The CPU 40 compares the detected environment temperature and the calculated winding temperature (Act 207).

If the environment temperature and the winding temperature are equal (YES in Act 207), the CPU 40 drives the motor driver 41 at the presently set driving voltage Vref and drives the pulse motor 33 again (Act 208).

However, for example, if the pulse motor 33 drives for a long time or if the pulse motor 33 is temporarily stopped after being driven for a long time and is driven again before being cooled, the temperature of the pulse motor 33 rises and the environment temperature and the winding temperature are different (NO in Act 207). In this case, the CPU 40 reads out, selecting and referring to the second data table stored in the memory 42, the driving voltage Vref' of the motor driver 41 with respect to the calculated temperature of the pulse motor 33 and sets the read-out driving voltage Vref' in the motor driver 41 (Act 209).

The CPU 40 supplies a desired driving clock CLK' simultaneously with setting of the driving voltage Vref' in the motor driver 41.

When the driving voltage Vref' is set in the motor driver 41 and the driving clock CLK' is supplied to the motor driver 41, the motor driver 41 supplies the motor driving current I' having a current value based on the temperature of the pulse motor 33 and a desired pulse train P' to the pulse motor 33. Consequently, the pulse motor 33 is driven again and generates predetermined torque (Act 210).

When the pulse motor 33 is driven in Act 208 or Act 210, the paper discharge roller 30a rotates. The rotating paper discharge roller 30a discharges a sheet having a copy image formed on one surface or both surfaces thereof to the stock section 31 or the ADU 32. When the sheet having the copy image formed on one surface thereof or the sheet reversed by the ADU 32 and having the copy image formed on both surfaces thereof is discharged to the stock section 31, the MFP 10 ends the operation for forming a copy image (Act 211). When the operation for forming a copy image is ended, the motor driver 41 ends the supply of the driving voltage Vref or Vref' and the driving clock CLK or CLK' to the pulse motor 33. The pulse motor 33 stops the rotation (Act 212).

With the motor driving control device, the image forming apparatus, and the image forming method according to the second embodiment explained above, as in the first embodiment, an appropriate motor driving current can be supplied to the pulse motor according to environment temperature. Therefore, the power consumption of the motor driving control device and the image forming apparatus can be reduced more than in the past.

Further, in the motor driving control device, the image forming apparatus, and the image forming method according to the second embodiment, even if the pulse motor 33 is continuously driven, since the appropriate motor driving current can be supplied to the pulse motor 33 according to environment temperature, a temperature rise ratio of the pulse motor 33 to time can be set lower than in the past. Therefore, the pulse motor 33 can be driven longer than in the past.

In the motor driving control device, the image forming apparatus, and the image forming method according to the second embodiment, the detection of environment temperature and the setting of the motor driver 41 based on the detected environment temperature are executed before the pulse motor 33 is driven. Consequently, even if only one copy image is formed, the power consumption of the MFP 10 can be reduced more than in the past.

With the motor driving control device, the image forming apparatus, and the image forming method according to the second embodiment, if the temperature of the pulse motor 33 and the environment temperature are different, a more appropriate motor driving current can be supplied to the pulse motor 33 according to the temperature of the pulse motor 33. Therefore, the power consumption of the motor driving control device and the image forming apparatus can be reduced more. Further, since the more appropriate motor driving current is supplied to the pulse motor 33, the temperature rise ratio of the pulse motor 33 to time can be set lower. Therefore, the pulse motor 33 can be driven longer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Figure 9:
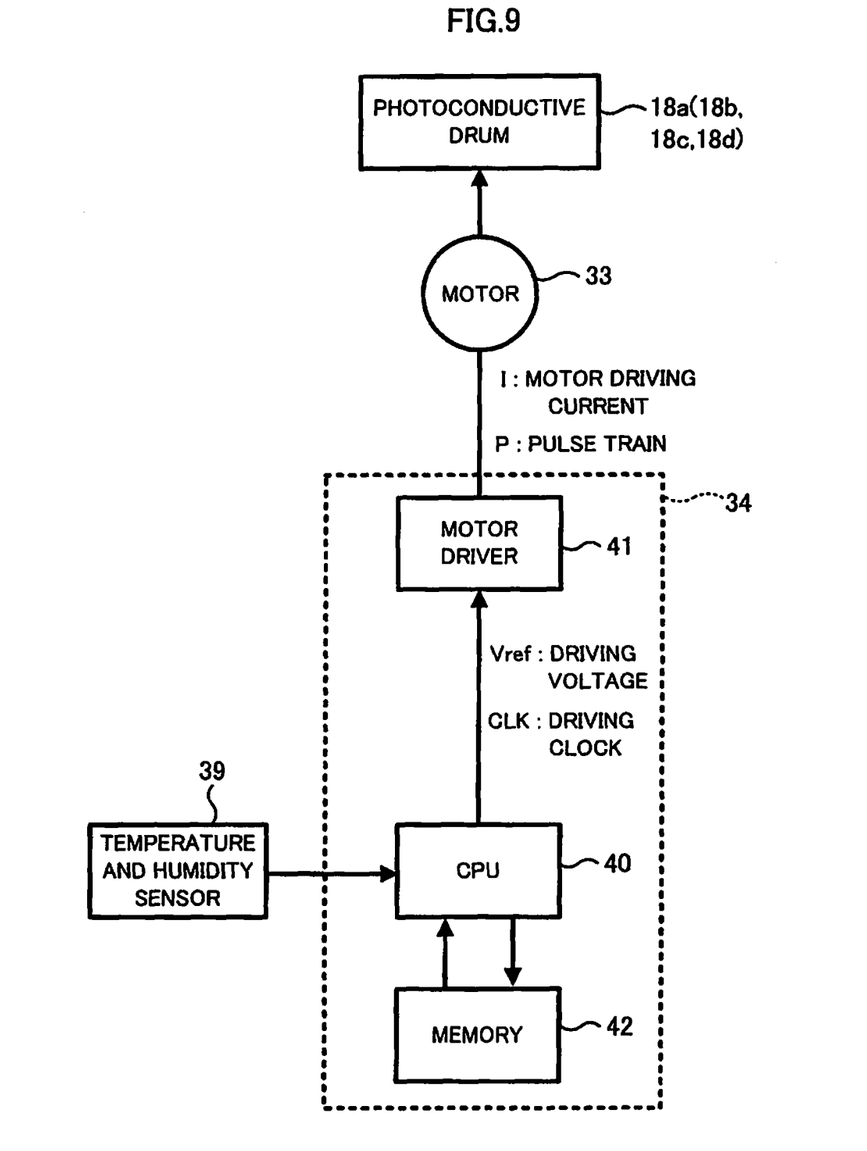
FIG. 9 is a diagram of a state in which the motor driving control device shown in FIG. 3 is connected to a photoconductive drum.

For example, the motor driving control devices 34 and 43 may be connected to each of the photoconductive drums 18a to 18d. FIG. 9 is a diagram of a state in which the motor driving control device 34 is connected to the photoconductive drum 18a.

Figure 10:
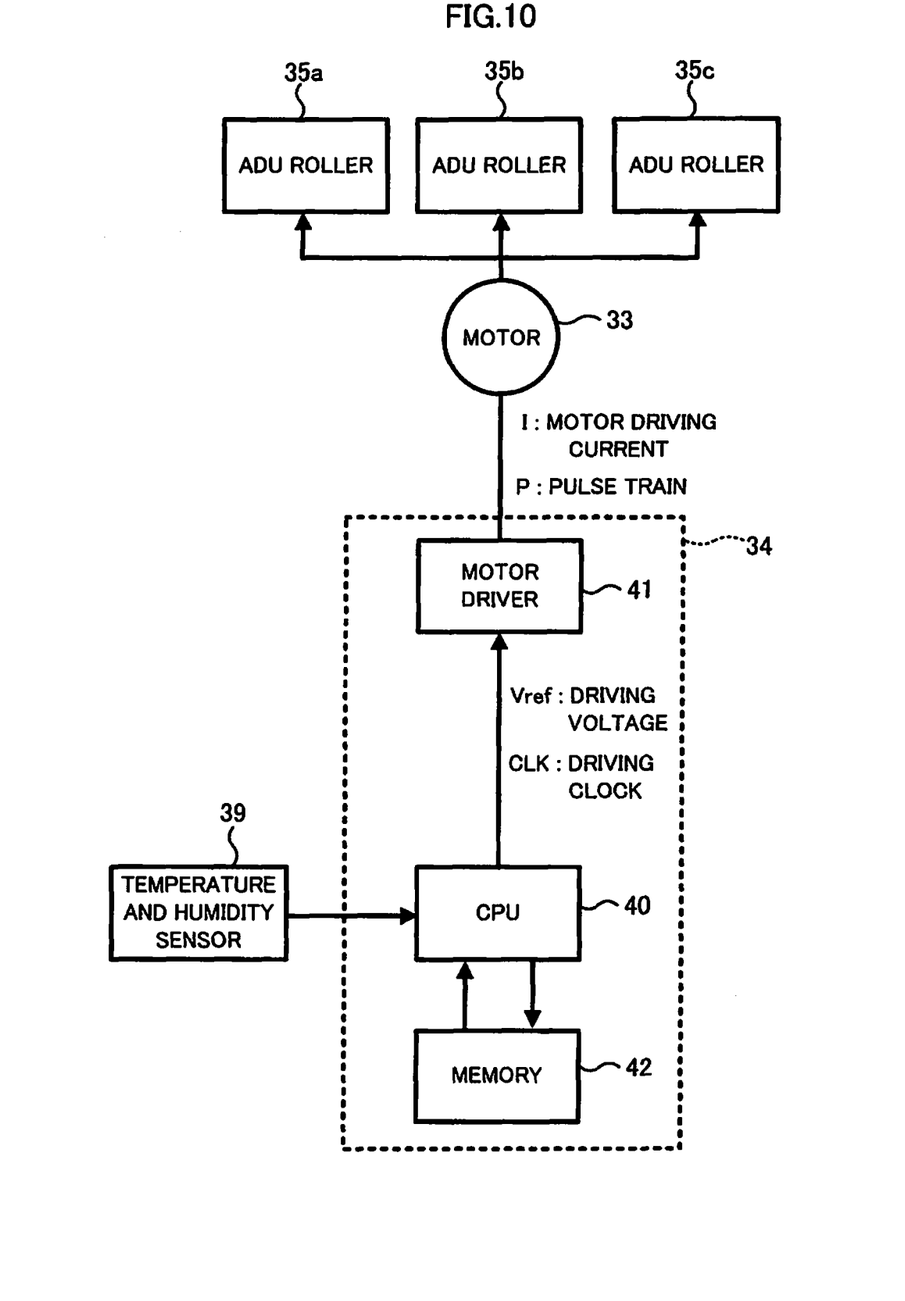
FIG. 10 is a diagram of a state in which the motor driving control device shown in FIG. 3 is collectively connected to plural ADU rollers.

The motor driving control devices 34 and 43 may be collectively connected to the plural ADU rollers 35a to 35c. FIG. 10 is a diagram of a state in which the motor driving control device 34 is collectively connected to the plural ADU rollers 35a to 35c.

Further, the motor driving control devices 34 and 43 may be connected to sections that need to rotate such as the conveying rollers 27, the aligning roller 28, and the pickup rollers 29.

What is claimed is:

1. A motor driving control device comprising:
   a motor driver configured to supply a motor driving current for driving a motor to the motor;
   a storage device configured to store a first data table in which a temperature around the motor, a current value of the motor driving current at which the motor is prevented from going out of step at the temperature, and a driving voltage to be applied to the motor driver in order to cause the motor driver to output the motor driving current having the current value, are associated with one another for each of different temperatures around the motor; and
   a control section configured to control the motor driver to output the motor driving current having a predetermined current value associated with the temperature around the motor by reading out the driving voltage associated with the temperature around the motor from the first data table and applying the read-out driving voltage to the motor driver.

2. The device according to claim 1, further comprising a winding resistance detection circuit configured to calculate a temperature of the motor, wherein
   the storage device further stores a second data table in which the temperature of the motor, a current value of the motor driving current at which the motor is prevented from going out of step at the temperature, and a driving voltage to be applied to the motor driver in order to cause the motor driver to output the motor driving current having the current value, are associated with one another for each of different temperatures of the motor, and
   the control section selects the first data table or the second data table on the basis of the temperature around the motor or the temperature of the motor and controls the motor driver to output the motor driving current having the predetermined current value associated with the temperature around the motor or the temperature of the motor in the selected table.

3. The device according to claim 2, wherein the control section reads out the driving voltage associated with the temperature around the motor or the temperature of the motor from the selected table and applies the read-out driving voltage to the motor driver to thereby control the motor driver to output the motor driving current having the predetermined current value associated with the temperature around the motor or the temperature of the motor.

4. The device according to claim 2, wherein the control section selects the first data table if the temperature around the motor and the temperature of the motor are equal.

5. The device according to claim 2, wherein the control section selects the second data table if the temperature around the motor and the temperature of the motor are different.

6. An image forming apparatus comprising:
   an image reading section configured to read an image of an original document and form image data of the image of the original document;
   an image forming section configured to form a copy image based on the image data on a sheet;
   a paper discharge roller configured to discharge the sheet having the copy image formed thereon;
   a motor configured to drive the paper discharge roller;
   a temperature and humidity sensor configured to detect a temperature around the motor;
   a motor driver configured to supply a motor driving current for driving the motor to the motor;
   a storage device configured to store a first data table in which the temperature around the motor, a current value of the motor driving current at which the motor is prevented from going out of step at the temperature, and a driving voltage to be applied to the motor driver in order to cause the motor driver to output the motor driving current having the current value, are associated with one another for each of different temperatures around the motor; and
   a control section configured to control the motor driver to output the motor driving current having a predetermined current value associated with the detected temperature around the motor by reading out the driving voltage associated with the temperature around the motor from the first data table and applying the read-out driving voltage to the motor driver.

7. The apparatus according to claim 6, further comprising a winding resistance detection circuit configured to calculate temperature of the motor, wherein
   the storage device further stores a second data table in which the temperature of the motor, a current value of the motor driving current at which the motor is prevented from going out of step at the temperature, and a driving voltage to be applied to the motor driver in order to cause the motor driver to output the motor driving current having the current value, are associated with one another for each of different temperatures of the motor, and
   the control section selects the first data table or the second data table on the basis of the detected temperature around the motor or the calculated temperature of the motor and controls the motor driver to output the motor driving current having the predetermined current value associated with the detected temperature around the motor or the calculated temperature of the motor in the selected table.

8. The apparatus according to claim 7, wherein the control section reads out the driving voltage associated with the detected temperature around the motor or the calculated temperature of the motor from the selected table and applies the read-out driving voltage to the motor driver to thereby control the motor driver to output the motor driving current having the predetermined current value associated with the detected temperature around the motor or the calculated temperature of the motor.

9. The apparatus according to claim 7, wherein the control section selects the first data table if the temperature around the motor and the temperature of the motor are equal.

10. The apparatus according to claim 7, wherein the control section selects the second data table if the temperature around the motor and the temperature of the motor are different.

11. The apparatus according to claim 6, further comprising a fixing device configured to fix, on the sheet, the copy image formed on the sheet, wherein
the paper discharge roller discharges the sheet having the copy image formed and fixed thereon.

12. An image forming method comprising:
detecting temperature around a motor;
reading out a driving voltage associated with the detected temperature around the motor from a first data table in which the temperature around the motor, a current value of a motor driving current at which the motor is prevented from going out of step at the temperature, and a driving voltage to be applied to a motor driver, which is configured to operate the motor, in order to cause the motor driver to output the motor driving current having the current value, are associated with one another for each of different temperatures around the motor,
applying the read-out driving voltage to the motor driver;
driving the motor by supplying, from the motor driver to which the read-out driving voltage is applied, the motor driving current having the current value associated with the detected temperature around the motor to the motor;
rotating, according to the driving of the motor, a paper discharge roller configured to discharge a sheet having a copy image of an original document formed thereon; and
discharging the sheet according to the rotation of the paper discharge roller.

13. The method according to claim 12, further comprising, after the driving of the motor:
calculating a temperature of the motor;
comparing the calculated temperature of the motor and the detected temperature around the motor;
selecting, on the basis of the comparing of the calculated temperature and the detected temperature, the first data table or a second data table in which the temperature of the motor, a current value of the motor driving current at which the motor is prevented from going out of step at the temperature, and a driving voltage to be applied to the motor driver in order to cause the motor driver to output the motor driving current having the current value, are associated with one another for each of different temperatures of the motor; and
supplying, according to the selected data table, the motor driving current having the current value associated with the detected temperature around the motor or the calculated temperature of the motor to the motor to drive the motor therewith.

14. The method according to claim 13, wherein the driving of the motor includes:
reading out the driving voltage associated with the detected temperature around the motor or the calculated temperature of the motor from the selected table;
applying the read-out driving voltage to the motor driver; and
supplying, from the motor driver to which the driving voltage is applied, the motor driving current having the current value associated with the detected temperature around the motor or the calculated temperature of the motor to the motor.

15. The method according to claim 13, wherein the selecting of the first table or the second table includes selecting the first data table if the temperature around the motor and the temperature of the motor are equal.

16. The method according to claim 13, wherein the selecting of the first table or the second table includes selecting the second data table if the temperature around the motor and the temperature of the motor are different.

17. The method according to claim 12, the discharging of the sheet includes discharging, according to the rotation of the paper discharge roller, the sheet having the copy image fixed thereon.

* * * * *